(12) United States Patent
Choi et al.

(10) Patent No.: US 10,429,180 B2
(45) Date of Patent: Oct. 1, 2019

(54) VERSINE TROLLEY-TYPE EQUIPMENT FOR INSPECTING TRACK IRREGULARITY

(71) Applicant: KOREA RAILROAD RESEARCH INSTITUTE, Gyeonggi-do (KR)

(72) Inventors: Il Yoon Choi, Gyeonggi-do (KR); Jun Suk Lee, Seoul (KR); Sam Young Kwon, Daejeon (KR); In Ki Min, Daejeon (KR)

(73) Assignee: KOREA RAILROAD RESEARCH INSTITUTE, Gyeonggi-Do (KR)

( * ) Notice: Subject to any disclaimer, the term of this patent is extended or adjusted under 35 U.S.C. 154(b) by 118 days.

(21) Appl. No.: 15/570,373

(22) PCT Filed: Feb. 22, 2016

(86) PCT No.: PCT/KR2016/001693
§ 371 (c)(1),
(2) Date: Oct. 30, 2017

(87) PCT Pub. No.: WO2016/175438
PCT Pub. Date: Nov. 3, 2016

(65) Prior Publication Data
US 2018/0143017 A1    May 24, 2018

(30) Foreign Application Priority Data
Apr. 30, 2015  (KR) .................. 10-2015-0061512

(51) Int. Cl.
*G01B 21/16* (2006.01)
*G01C 9/00* (2006.01)
(Continued)

(52) U.S. Cl.
CPC .............. *G01B 21/16* (2013.01); *B61K 9/00* (2013.01); *B61L 23/047* (2013.01);
(Continued)

(58) Field of Classification Search
CPC ....... B61K 9/00; B61L 23/047; B61L 23/048; B61L 15/0027; B61L 23/041;
(Continued)

(56) References Cited

U.S. PATENT DOCUMENTS

| 4,040,738 A | 8/1977 | Wagner |
| 2003/0048193 A1* | 3/2003 | Puckette, IV ............ B61K 9/08 340/679 |

(Continued)

FOREIGN PATENT DOCUMENTS

KR            100737517           7/2007

OTHER PUBLICATIONS

Nielsen et al., "Overview of Methods for Measurement of Track Irregularities Important for Ground-Borne Vibration," Railway Induced Vibration Abatement Solutions Collaborative project (RIVAS), Jul. 2013, pp. 1-49.

(Continued)

*Primary Examiner* — Yaritza Guadalupe-McCall
(74) *Attorney, Agent, or Firm* — JCIPRNET

(57) ABSTRACT

Provided is versine trolley-type equipment for inspecting a track irregularity, having sensors respectively provided to a trolley so as to measure a height difference, direction misalignment, gauge irregularity, rail longitudinal slope, cant and the like of railroad rails, and simultaneously measuring the height difference and direction misalignment of a left rail and a right rail so as to reduce a measurement time by half and, also, allowing left and right measurement frames to freely move in a vertical direction within a predetermined range, thereby bringing front and rear trolley wheels of the left and right measurement frames into close contact with the rails all the time even if the rails are warped.

10 Claims, 8 Drawing Sheets

(51) Int. Cl.
*G01P 3/00* (2006.01)
*B61K 9/00* (2006.01)
*G01B 21/30* (2006.01)
*G01B 21/32* (2006.01)
*B61L 23/04* (2006.01)

(52) U.S. Cl.
CPC ............ B61L 23/048 (2013.01); *G01B 21/30* (2013.01); *G01B 21/32* (2013.01); *G01C 9/00* (2013.01); *G01P 3/00* (2013.01)

(58) Field of Classification Search
CPC ..... B61L 25/021; B61L 25/025; G01B 21/16; G01B 21/30; G01B 21/32; G01C 9/00
USPC ........................................................... 33/651
See application file for complete search history.

(56) References Cited

U.S. PATENT DOCUMENTS

| 2010/0026551 | A1* | 2/2010 | Szwilski | B61K 9/08 |
| | | | | 342/22 |
| 2011/0181721 | A1* | 7/2011 | Bloom | B61K 9/08 |
| | | | | 348/148 |
| 2012/0192756 | A1* | 8/2012 | Miller | B61K 9/08 |
| | | | | 104/2 |
| 2017/0305442 | A1* | 10/2017 | Viviani | B61D 15/12 |
| 2018/0143017 | A1* | 5/2018 | Choi | G01B 21/16 |

OTHER PUBLICATIONS

"International Search Report (Form PCT/ISA/210)", dated May 13, 2016, with English translation thereof, pp. 1-4.

\* cited by examiner $$y = x_2 - \frac{x_1 + x_3}{2}$$

VERSINE TROLLEY-TYPE EQUIPMENT FOR INSPECTING TRACK IRREGULARITY

CROSS-REFERENCE TO RELATED APPLICATION

This application is a 371 of international application of PCT application serial no. PCT/KR2016/001693, filed on Feb. 22, 2016, which claims the priority benefit of Korea application no. 10-2015-0061512, filed on Apr. 30, 2015. The entirety of each of the above-mentioned patent applications is hereby incorporated by reference herein and made a part of this specification.

TECHNICAL FIELD

The present disclosure relates to a track irregularity inspection of a railroad rail, and more specifically, to a versine trolley-type equipment for inspecting track irregularity by installing sensors at a trolley so as to measure a height difference, direction misalignment, gauge irregularity, rail longitudinal slope, cant, and the like, and which is capable of simultaneously measuring height difference and direction misalignment of left and right rails.

BACKGROUND ART

Generally, a track serves to guide a train to a predetermined railroad as well as to distribute a load of the train, which is transmitted to a lower portion of the train, to protect a structure below the train. Also, driving stability and a ride comfort of the train are directly influenced by performance of the track, and most of a railroad environmental noise and vibration are caused by interaction between the track and a wheel. Thus, the track is a major factor directly affecting stability, economic feasibility, and comfortability of an entire railroad system.

However, such a track is undergone a very small amount of permanent deformation caused by passing of the train, and such deformation is accumulated as time passes to cause irregularity on a railroad surface. Specifically, since the track is configured with a simplified structure against an excessive train load acting while the train travels at a high speed, the track is a special structure that is required for a continuous maintenance in which renewal of a member is relatively frequently performed due to degradation of a material when compared to a general structure.

In repair of track irregularity, which already occupies a large part of a track maintenance work, a track inspection car has already been put into a practical use, and a state of the track has been regularly checked and the repair has been performed on the basis of a predetermined evaluation standard. In a sense, this is a repair system that is close to a monitored maintenance. However, in terms of priority of repair and an input amount thereof, data support is insufficient and thus, except that a mobilizable repair effort is first put into management of a special value, the remaining labor resources are sequentially distributed according to experience and intuition.

In the railroad, a role of the track is to surely realize a wheel runway defined by a track geometry, but in reality, there occurs an error. That is, the track serves to support and smoothly guide the train, but, when the track repetitively receives a load of the train, deformation gradually occurs on the track to cause unconformity with a running surface of a tracked vehicle, and this is called as track irregularity.

As a speed of the tracked vehicle increases, such track irregularity may cause a serious accident even with only small track irregularity.

For example, an increase in track irregularity may lead to an increased train jolt and deterioration in a ride comfort of a passenger, and, when such track irregularities become large or composite irregularities occur with other track irregularities, a derailment of a train may be caused. Therefore, a measurement of the track irregularity is a very important factor in ensuring stability of railroad transportation, and the need for measurement is gradually increasing even in terms of maintenance and repair of the railroad.

The track irregularity is an indicator of track maintenance, and is a decisive factor for driving stability of the train and a ride comfort of a passenger. The track maintenance is a task to restore the track irregularity within a predetermined standard limit, and it should be able to secure a ride comfort by ensuring prevention of accidents from the viewpoint of safety.

The track irregularity may be dynamically measured using a track inspection vehicle at regular intervals according to an operation of the train, or may be statically measured using a manpower or a simple inspection device as necessary.

Meanwhile, to secure driving stability and ride quality of a railroad vehicle, the track should be constructed and managed within a predetermined tolerance. Such a tolerance is called as track irregularity, and includes a height difference, direction misalignment, horizontal misalignment, warping, gauge, and the like. Among these inspection items, a method for inspecting the height difference and the direction misalignment is classified into two methods. The first method is a method for measuring a relative distance from a string that is spaced apart by a constant distance, that is, an inspection method using versine. This inspection method using versine is a method for mainly measuring displacement at three positions from a vehicle body to obtain an amount of a chord offset. Also, the second method is a method for measuring an absolute position in a space using a gyroscope and an accelerometer, and calculating track irregularity on the basis of the measured absolute position.

Meanwhile, FIG. 1 is a diagram illustrating a trolley-type track irregularity inspection device according to the related art, FIGS. 2A to 2C are photographs each illustrating in detail the trolley-type track irregularity inspection device shown in FIG. 1, FIG. 2A is a lateral view, FIG. 2B is a front view, and FIG. 2C illustrates sensors installed at a main measurement versine.

As shown in FIG. 1, the trolley-type track irregularity inspection device 10 according to the related art inspects track irregularity by installing a height sensor 11, a plane deformation sensor 12, a gauge sensor 13, and a level sensor 14, and, at this point, in the case of a height difference and direction misalignment, since the sensors are installed only on a left rail or a right rail, the height difference and the direction misalignment cannot be simultaneously measured on the left and right rails.

Accordingly, in the case of the trolley-type track irregularity inspection device 10 according to the related art, only one rail of the left and right rails is first measured, and then the other rail should be measured. In other words, the trolley-type track irregularity inspection device for measuring a height difference and direction misalignment of one rail has a problem in that the height difference and the direction misalignment should be measured on the left and right rails twice by moving a main measurement versine.

Meanwhile, as a prior art, Korean Registered Patent No. 10-737517 discloses the invention entitled "System and Method for Measuring Railroad Rail," and it will be described with reference to FIGS. 3A and 3B.

FIGS. 3A and 3B are perspective views each illustrating a system for measuring a railroad rail according to the related art.

Referring to FIGS. 3A and 3B, the system for measuring a railroad rail according to the related art includes a main frame 61 which is a main measurement versine located in a direction perpendicular to a traveling direction of each of both left and right rails; a handle 62 provided at the main frame 61; an auxiliary frame 66 coupled to a right side of the main frame 61 in the same direction as the traveling direction of the right rail and relatively rotatably coupled to the main frame 61 by a hinge 63; a first horizontal roller 65a provided at both end portions of the auxiliary frame 66 and configured to rotate along an upper surface of the right rail; a first lateral roller 65b provided at both of the end portions of the auxiliary frame 66 and configured to rotate along an inner side surface of the right rail; a second horizontal roller 65d provided at a left distal end of the main frame 61 and configured to rotate along an upper surface of the left rail; a second lateral roller 65c provided at a left side of the main frame 61 and configured to be brought into close contact with and rotate along an inner side surface of the left rail; a gauge measurement sensor 21 provided at the left side of the main frame 61 and configured to emit a laser or an infrared ray toward the inner side surface of the left rail, receive the reflected light from the inner side surface thereof, and output a variation detection signal of gauge between the left and right rails; a height measurement sensor 22 provided at a central portion of the auxiliary frame 66 and configured to emit a laser or an infrared ray on the upper surface of the right rail, receive the reflected light from the upper surface thereof, and output a height detection signal of the right rail according to a time from the emitting and receiving of light; an angle measurement sensor 23 configured to measure whether an angle between the main frame 61 and the auxiliary frame 66 is 90° and output a detection signal; and a leveler 25 provided on an upper surface of the main frame 61 and configured to detect whether the main frame 61 is horizontal in a state in which the main frame 61 is hung on the left and right rails and output a detected level.

As shown in FIGS. 3A and 3B, the system for measuring a railroad rail according to the related art measures warping of a railroad rail, gauge irregularity thereof, flatness of an upper surface thereof, and horizontal misalignment thereof in consideration of gauge between left and right rails, a height therebetween, an ambient temperature, and the like so that maintenance and repair of the railroad rail may be easily performed and accidents and the like may be prevented in advance.

In such a system for measuring a railroad rail, the sensors detect the gauge and the height between the rails, a horizontal degree of each of the rails, and the ambient temperature, an analog-to-digital (A/D) converter converts analog signals from the sensors into corresponding digital signals, and a memory stores measured data. Also, an arithmetic part calculates an interval between the rails according to the output signals from the sensors on the basis of a contraction ratio and an expansion ratio of each of the rails according to a temperature, calculates a height difference between the rails, and calculate gauge between the rails and whether each of the rails is horizontal, and a display outputs the calculated results of the arithmetic part.

In other words, the system for measuring a railroad rail according to the related art may measure the height and the interval between the rails while moving along the railroad rail, and measure direction misalignment of the railroad rail, gauge irregularity, flatness of an upper surface of the rails, horizontal irregularity, and the like in consideration of the contraction ratio and the expansion ratio of each of the rails due to a difference in temperature, and thus it may employ a contact-type measurement method in which the system is in contact with the rails.

However, as described above, the system for measuring a railroad rail according to the related art should move the main measurement versine two times to measure the height difference and the direction misalignment of each of the left and right rails as shown in FIGS. 3A and 3B so that there is a problem in that a measurement time becomes long.

Also, to measure a versine height difference and versine direction misalignment, front and rear trolley wheels should be brought in close contact with the rails. Therefore, in a conventional system in which the front and rear trolley wheels are installed at a measurement frame and a single wheel is installed at another rail, the three wheels can be geometrically in close contact with the rails using a hydraulic pressure, a spring, or the like. However, when a left frame and a right frame are configured to have a rigid connected structure so as to simultaneously measure the left and right rails, left and right trolley wheels are not brought into close contact with the rails, so that there is a problem in that it is difficult to accurately measure the versine height difference and the versine direction misalignment.

DISCLOSURE

Technical Problem

It is an object of the present disclosure to provide a versine trolley-type equipment for inspecting track irregularity by installing sensors at a trolley so as to measure a height difference, direction misalignment, gauge irregularity, rail longitudinal slope, cant, and the like, and which is capable of simultaneously measuring a height difference and direction misalignment of left and right rails.

It is another object of the present disclosure to provide a versine trolley-type equipment for inspecting track irregularity, in which left and right measurement frames are configured to vertically freely move within a predetermined range to allow front and rear trolley wheels of the left and right measurement frames to be brought into close contact with rails all the time even when the rails are warped, and first and second vertical measurement wheels are respectively provided so that first and second height difference sensors, which are displacement sensors, can detect vertical movement amounts of the first and second vertical measurement wheels to measure a versine height difference.

It is still another object of the present disclosure to provide a versine trolley-type equipment for inspecting track irregularity, in which left and right measurement frames are configured to horizontally freely move within a predetermined range to allow front and rear trolley wheels of the left and right measurement frames to be brought into close contact with rails all the time even when enlargement and narrowness of gauge between the rails and direction misalignment therebetween occur, and horizontal measurement wheels are respectively installed so that first and second direction misalignment sensors, which are displacement sensors, can detect horizontal movement amounts of the horizontal measurement wheels to measure a versine direction misalignment.

Technical Solution

To attain the above-described objects, a versine trolley-type equipment for inspecting track irregularity according to the present disclosure, which is capable of simultaneously measuring a height difference and direction misalignment of left and right rails, is configured to include versine left and right measurement frames on which front and rear trolley wheels are mounted, and hung on the left and right rails to move along the left and right rails for a versine inspection; first and second vertical measurement wheels installed on outer surfaces of the versine left and right measurement frames so as to be able to detect a height difference of each of the left and right rails; first and second height difference sensors respectively engaged with the first and second vertical measurement wheels to detect the height difference of each of the left and right rails; first and second direction misalignment sensors respectively installed on inner surfaces of the versine left and right measurement frames to detect a direction misalignment of each of the left and right rails; horizontal measurement wheels respectively connected to the first and second direction misalignment sensors and interposed at inner lower portions between the versine left and right measurement frames so as to allow the first and second direction misalignment sensors to detect the direction misalignment; and a horizontal connection frame interposed between the versine left and right measurement frames and configured to connect the versine left measurement frame to the right measurement frame.

Here, the first and second vertical measurement wheels may be respectively installed at the left and right measurement frames to vertically freely move within a predetermined range, and the first and second height difference sensors, which are displacement sensors, may detect vertical movement amounts of the first and second vertical measurement wheels to measure a versine height difference.

Here, the horizontal measurement wheels may be respectively installed at the left and right measurement frames to horizontally freely move within a predetermined range, and the first and second direction misalignment sensors, which are displacement sensors, may detect horizontal movement amounts of the horizontal measurement wheels to measure a versine direction misalignment.

Here, a horizontal elastic spring may be installed at the horizontal connection frame to allow the front and rear trolley wheels, which are installed at front and rear sides of the left and right measurement frames, to be respectively brought into close contact with upper surfaces of the left and right rails and side surfaces thereof, and support the horizontal connection frame connected to the left measurement frame, and an elastic force may be applied to the right measurement frame by the horizontal elastic spring so that the front and rear trolley wheels on left and right sides are respectively brought in close contact with the left and right rails.

Here, when the horizontal connection frame is connected to the right measurement frame, horizontal measurement wheel adjustment springs may be installed at left and right end portions of the horizontal connection frame, and the left horizontal measurement wheel and the right horizontal measurement wheel may be respectively brought into close contact with the left and right rails using elastic forces of the horizontal measurement wheel adjustment springs.

Here, when a traveling direction of each of the left and right rails, which is a traveling direction of each of the left and right measurement frames, is defined as an X-axis, a horizontal direction of each of the left and right rails is defined as a Y-axis, and a vertical direction of each thereof is defined as a Z-axis, the left measurement frame may be able to yaw about the Z-axis and to pitch about the Y-axis with respect to the right measurement frame, and the yawing and the pitching may be allowed within a predetermined angle by restricting rotation over a predetermined magnitude.

Here, a connection box may be formed at an end portion of the horizontal connection frame, and a horizontal elastic spring and a horizontal measurement wheel adjustment spring may be installed inside the connection box, wherein the horizontal elastic spring may be installed at left and right sides inside the connection box for a buffering effect and confinement of rotation with respect to the Z-axis and may be in contact with a surface of the connection box of the horizontal connection frame to prevent rotation over a predetermined limit with respect to the Z-axis.

Here, the horizontal measurement wheel adjustment spring may be installed at upper and lower sides inside the connection box for a buffering effect and confinement of rotation with respect to the Y-axis, and may be in contact with the surface of the connection box of the horizontal connection frame to prevent rotation over a predetermined limit with respect to the Y-axis.

The versine trolley-type equipment for inspecting track irregularity according to the present disclosure may further include a rail slope sensor installed at the versine left measurement frame and configured to detect a rail longitudinal slope; a taco sensor installed at an outer side surface of the versine right measurement frame and configured to measure a speed of the versine trolley-type equipment for inspecting track irregularity; a gauge sensor configured to detect a gauge between the left and right rails; and a cant sensor installed at an upper left portion of the horizontal connection frame and configured to detect a cant amount.

The versine trolley-type equipment for inspecting track irregularity according to the present disclosure may further include a data acquisition (DAQ) system installed at the horizontal connection frame and configured to acquire and display values detected from the sensors.

Advantageous Effects

According to the present disclosure, there is provided the versine trolley-type equipment for inspecting track irregularity by installing the sensors at the trolley so as to measure a height difference, direction misalignment, gauge irregularity, rail longitudinal slope, cant, and the like of the railroad rail, and which is capable of simultaneously measuring a height difference and direction misalignment of the left and right rails to reduce a measurement time by half.

According to the present disclosure, the left and right measurement frames vertically freely move within a predetermined range so that the front and rear trolley wheels of the left and right measurement frames may be brought into close contact with the rails all the time even when the rails are warped, and the first and second vertical measurement wheels are respectively installed so that the first and second height difference sensors, which are displacement sensors, can detect vertical movement amounts of the first and second vertical measurement wheels to easily measure a versine height difference.

According to the present disclosure, the left and right measurement frames horizontally freely move within a predetermined range so that the front and rear trolley wheels of the left and right measurement frames can be brought into close contact with the rails all the time even when enlargement and narrowness of gauge between the rails and direction misalignment therebetween occur, and the horizontal measurement wheels are respectively installed so that the first and second direction misalignment sensors, which are displacement sensors, can detect horizontal movement amounts of the horizontal measurement wheels to easily measure a versine direction misalignment.

MODES OF THE INVENTION

Figure 1:
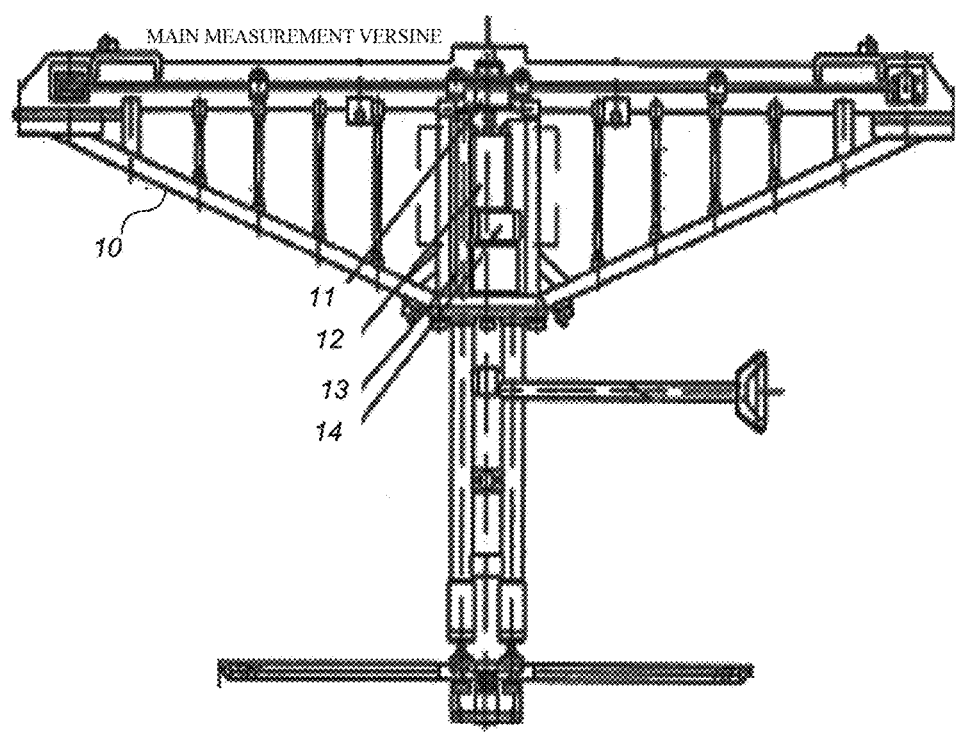
FIG. 1 is a diagram illustrating a trolley-type track irregularity inspection device according to the related art.
Figure 2A:
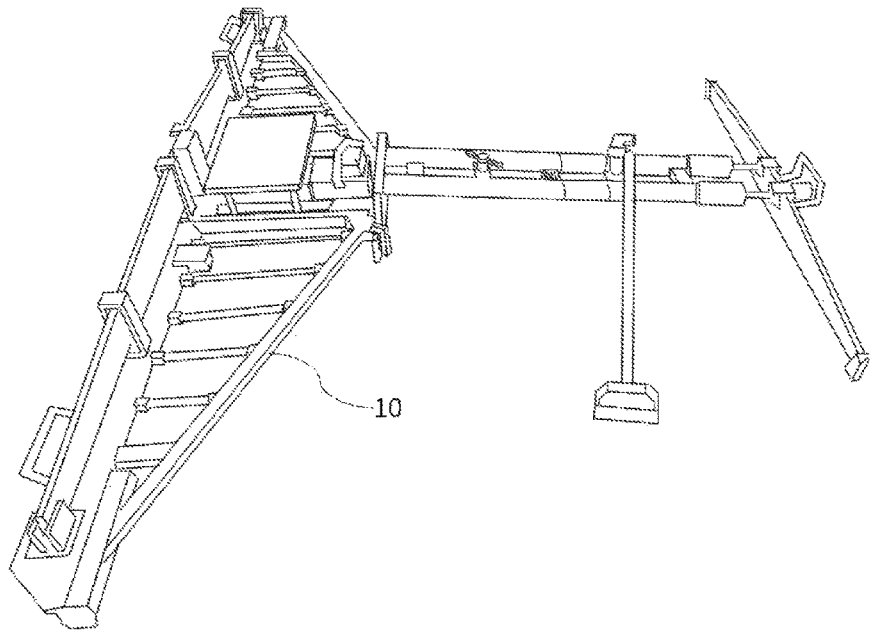
FIGS. 2A to 2C are photographs each illustrating in detail the trolley-type track irregularity inspection device shown in FIG. 1.
Figure 2B:
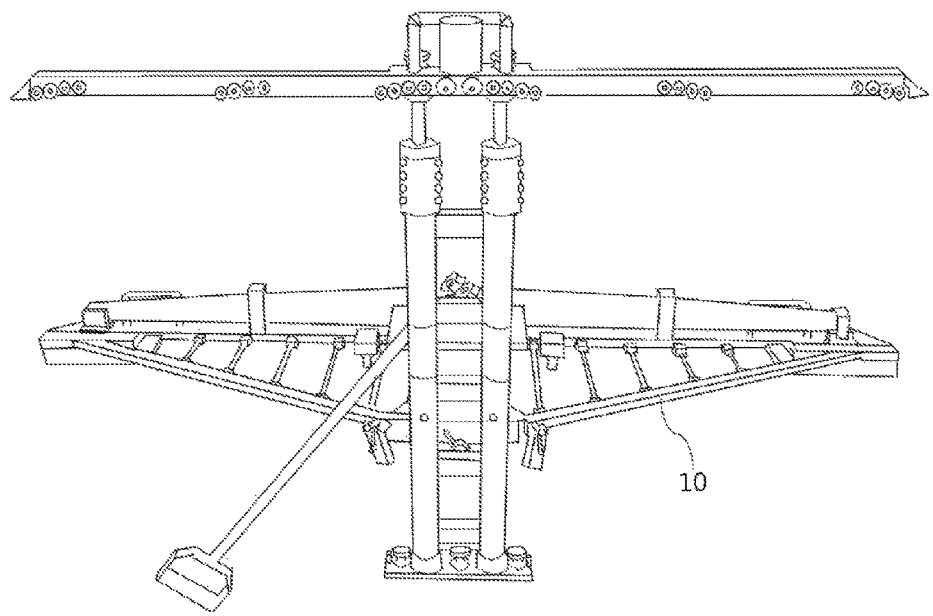
Figure 2C:
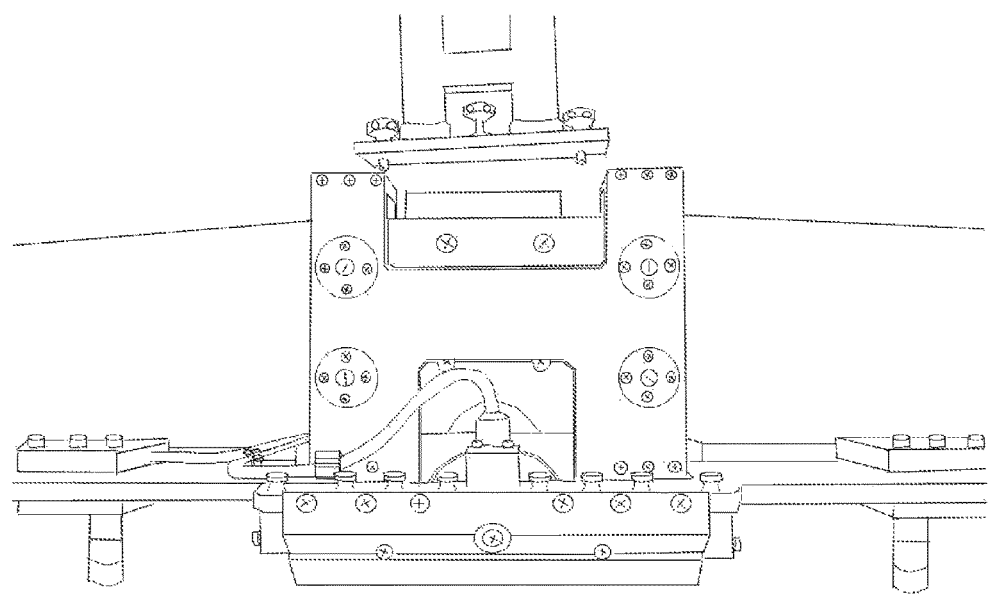
Figure 3A:
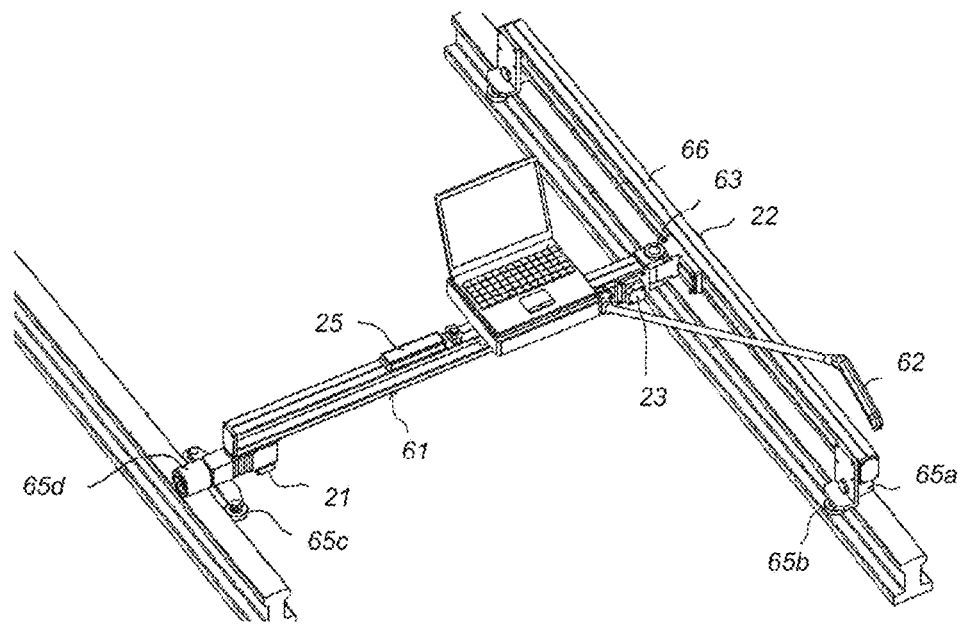
FIGS. 3A and 3B are perspective views each illustrating a system for measuring a railroad rail according to the related art.
Figure 3B:
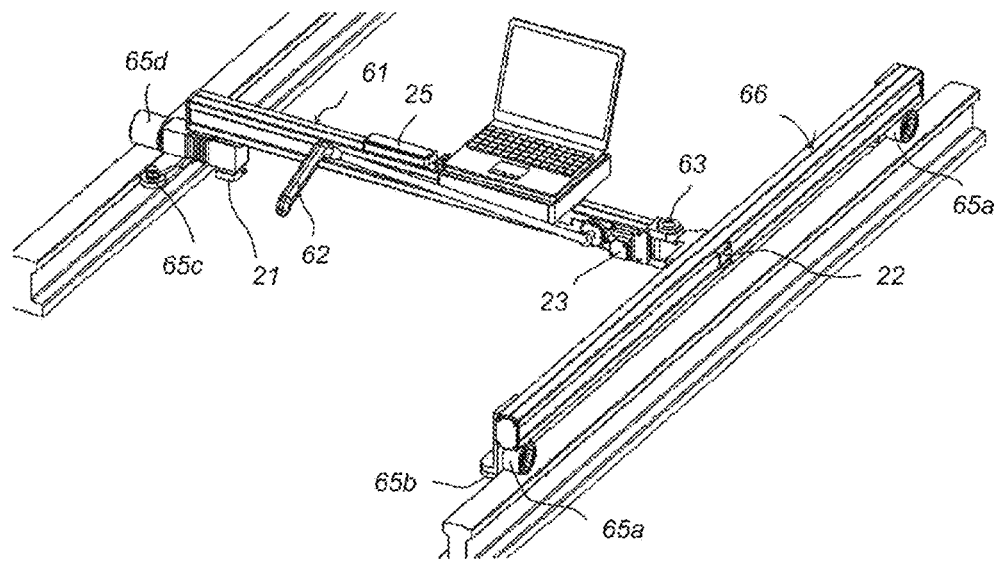

Embodiments of the present disclosure will be described in detail below which is suitable for easy implementation by those skilled in the art with reference to the accompanying drawings. However, the present disclosure may be implemented in various different forms, and thus it is not limited to embodiments to be described herein. In the drawings, some portions not related to the description will be omitted in order to clearly describe the present disclosure, and similar reference numerals are given to similar components throughout the disclosure.

Throughout the disclosure, when an element is referred to as "comprising" a component, it refers to that the element can further include other components, not excluding the other components unless specifically stated otherwise.

[Versine Trolley-Type Equipment for Inspecting Track Irregularity]

Figure 4:
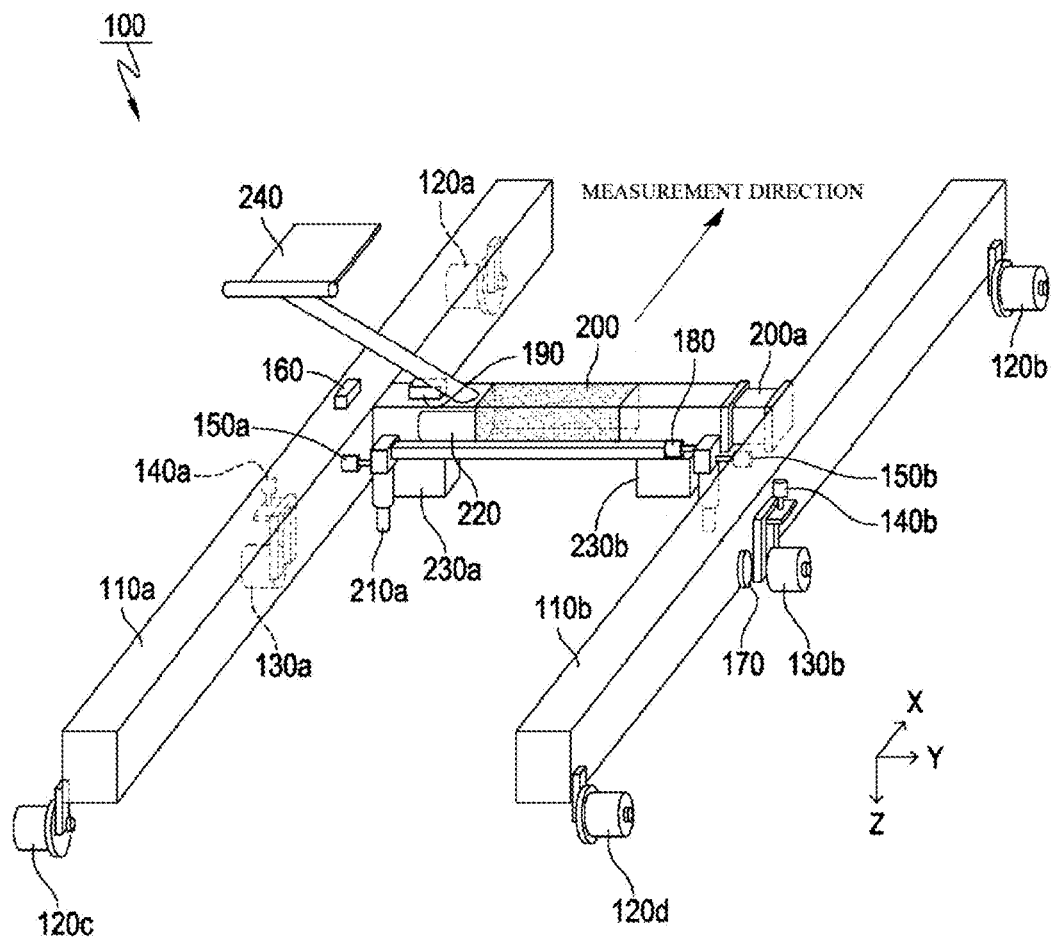
FIG. 4 is a diagram illustrating a versine trolley-type equipment for inspecting track irregularity according to an embodiment of the present disclosure.
Figure 5B:
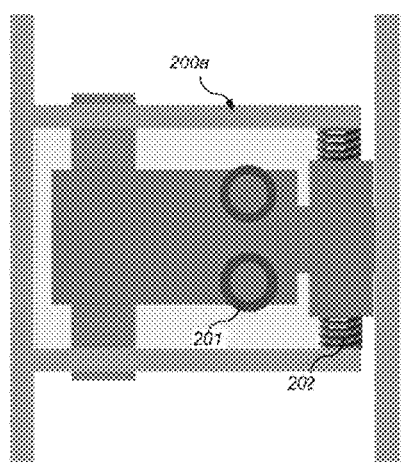
FIGS. 5A to 5F are diagrams each illustrating in detail a connection box of a horizontal connection frame in the versine trolley-type equipment for inspecting track irregularity according to the embodiment of the present disclosure.
Figure 5A:
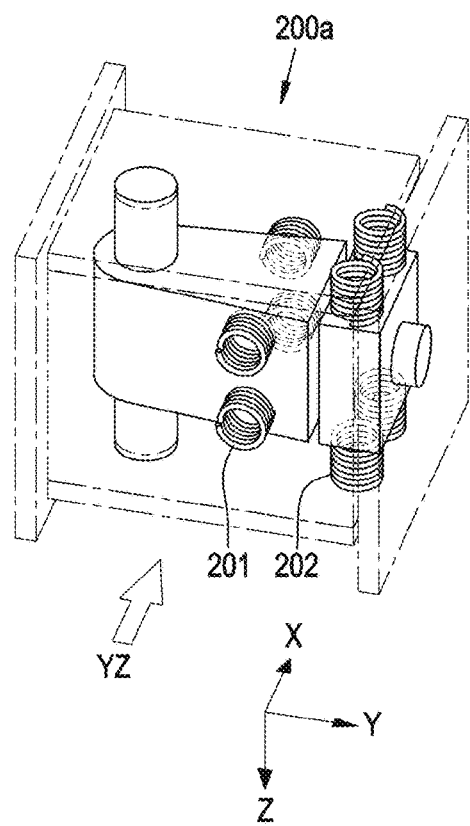
Figure 5D:
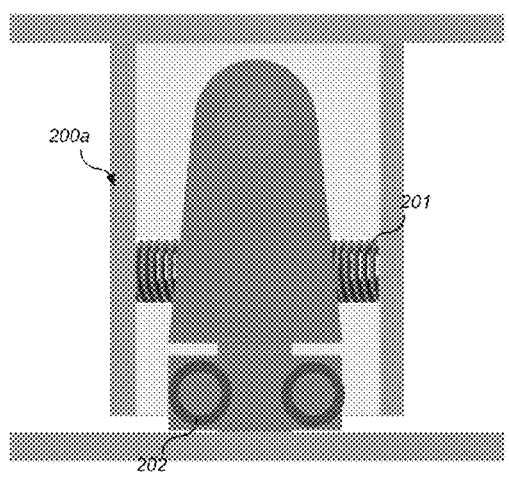
Figure 5C:
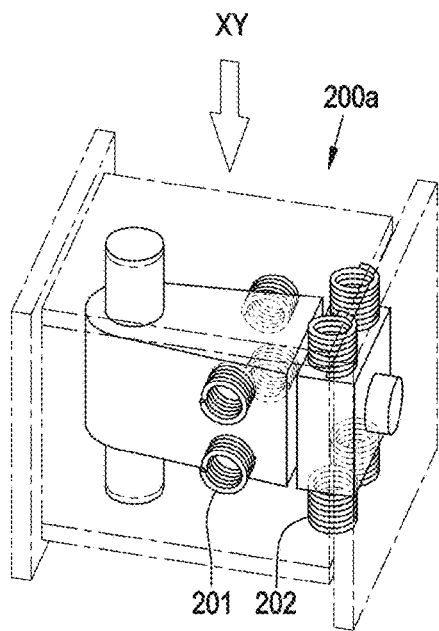
Figure 5F:
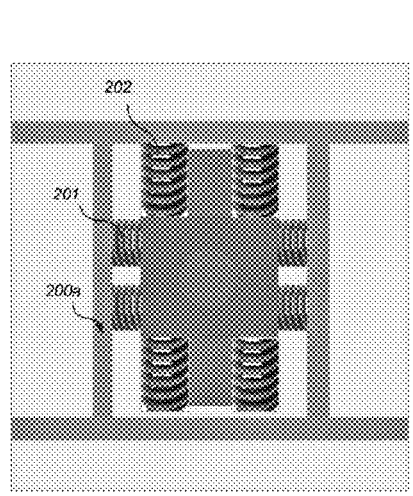
Figure 5E:
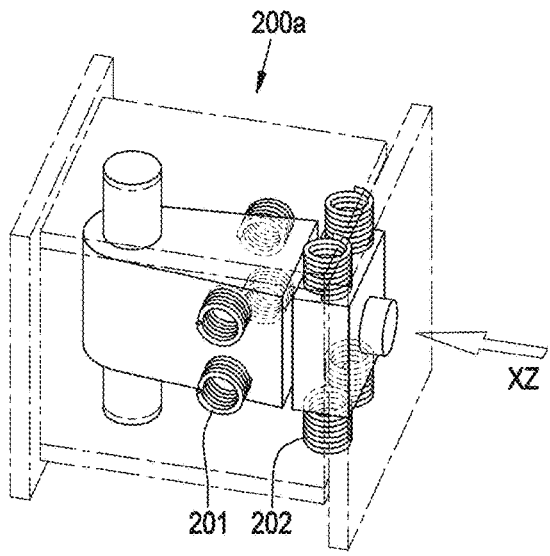
Figure 6:
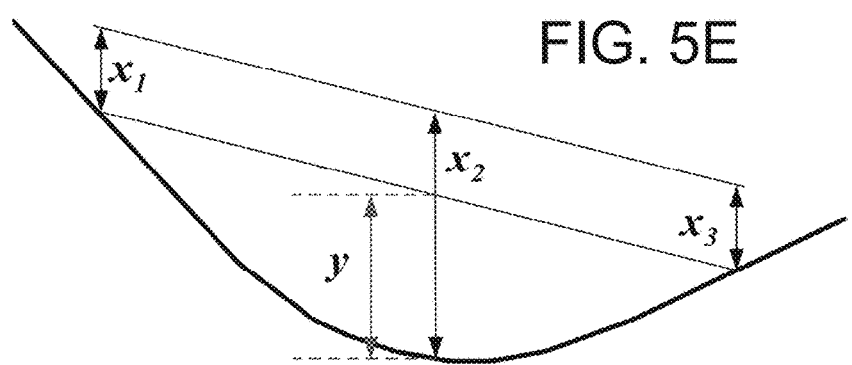
FIG. 6 is a diagram illustrating a calculation principle of versine in the versine trolley-type equipment for inspecting track irregularity according to the embodiment of the present disclosure.

FIG. 4 is a diagram illustrating a versine trolley-type equipment for inspecting track irregularity according to an embodiment of the present disclosure, FIGS. 5A to 5F are diagrams each illustrating in detail a connection box of a horizontal connection frame in the versine trolley-type equipment for inspecting track irregularity according to the embodiment of the present disclosure, and FIG. 6 is a diagram illustrating a calculation principle of versine in the versine trolley-type equipment for inspecting track irregularity according to the embodiment of the present disclosure.

Referring to FIG. 4, a versine trolley-type equipment 100 for inspecting track irregularity according to an embodiment of the present disclosure includes versine left and right measurement frames 110a and 110b, front and rear trolley wheels 120a to 120d, first and second vertical measurement wheels 130a and 130b, first and second height difference sensors 140a and 140b, first and second direction misalignment sensors 150a and 150b, a rail slope sensor 160, a taco sensor 170, a gauge sensor 180, a cant sensor 190, a horizontal connection frame 200, horizontal measurement wheels 210a and 210b, a horizontal elastic spring 220, horizontal measurement wheel adjustment springs 230a and 230b, and a data acquisition (DAQ) system 240, and a connection box 200a is formed at an end portion of the horizontal connection frame 200 to connect the right measurement frame 110b to the horizontal connection frame 200.

The versine trolley-type equipment 100 for inspecting track irregularity according to the embodiment of the present disclosure is equipment for inspecting track irregularity by installing sensors at a trolley to measure a height difference, direction misalignment, gauge irregularity, a rail longitudinal slope, cant, and the like of a railroad rail.

$$y = x_2 - \frac{x_1 + x_3}{2} \qquad \text{[Equation 1]}$$

As shown in FIG. 6, the height difference and the direction misalignment are respectively measured with versine measuring a relative displacement of a measurement wheel at a center point from a straight line connecting a previous value to a subsequent value, track irregularity may be measured as Equation 1, and warping representing a difference between a measured cant value and a cant value within a certain distance may be calculated.

Specifically, the versine left and right measurement frames 110a and 110b are mounted with the front and rear trolley wheels 120a to 120d, and are respectively hung on left and right rails to move therealong for a versine inspection.

The first and second vertical measurement wheels 130a and 130b are respectively installed at the versine left and right measurement frames 110a and 110b so as to be able to detect a height difference of each of the left and right rails, and the first and second height difference sensors 140a and 140b are respectively engaged with the first and second vertical measurement wheels 130a and 130b to detect the height difference of each of the left and right rails. Accordingly, in the case of the versine trolley-type equipment 100 for inspecting track irregularity according to the embodiment of the present disclosure, the first and second vertical measurement wheels 130a and 130b may be installed at the left and right measurement frames 110a and 110b to vertically freely move within a predetermined range, and vertical movement amounts of the first and second vertical measurement wheels 130a and 130b may be measured using the first and second height difference sensors 140a and 140b, which are displacement sensors, to measure a versine height difference.

The horizontal measurement wheels 210a and 210b are respectively connected to the first and second direction misalignment sensors 150a and 150b to allow the first and second direction misalignment sensors 150a and 150b to detect a direction misalignment, and the horizontal measurement wheels 210a and 210b are respectively interposed at inner sides between the versine left and right measurement frames 110a and 110b. Also, the first and second direction misalignment sensors 150a and 150b are respectively installed at the inner insides of the versine left and right measurement frames 110a and 110b to detect a direction misalignment of each of the left and right rails. Accordingly, in the case of the versine trolley-type equipment 100 for inspecting track irregularity according to the embodiment of the present disclosure, the horizontal measurement wheels 210a and 210b are respectively installed at the left and right measurement frames 110a and 110b to horizontally freely move within a predetermined range, so that horizontal movement amounts of the horizontal measurement wheels 210a and 210b may be measured using the first and second direction misalignment sensors 150a and 150b, which are displacement sensors, to measure a versine direction misalignment.

The rail slope sensor 160 is installed at the versine left measurement frame 110a to detect a rail longitudinal slope.

The taco sensor 170 is installed on an outer side surface of the versine right measurement frame 110b to measure a speed of the versine trolley-type equipment 100 for inspecting track irregularity according to the embodiment of the present disclosure, and the taco sensor 170 may be, for example, a tacometer.

The gauge sensor 180 detects gauge between the left and right rails.

The cant sensor 190 is installed at a left side of the horizontal connection frame 200 to detect a cant amount.

The horizontal connection frame 200 is interposed between the versine left and right measurement frames 110a and 110b to connect the versine left measurement frame 110a to the versine right measurement frame 110b. Specifically, the versine trolley-type equipment 100 for inspecting track irregularity according to the embodiment of the present disclosure has a structure in which an air spring or an elastic spring is installed to allow the front and rear trolley wheels 120a to 120d, which are installed at front and rear sides of the left and right measurement frames 110a and 110b, to be respectively brought into close contact with the left and right rails, thereby supporting the horizontal connection frame 200 connected to the left measurement frame 110a and applying an elastic force to the right measurement frame 110b by the elastic spring to allow the front and rear trolley wheels 120a to 120d, which are located at left and right sides of the horizontal connection frame 200, to be respectively brought into close contact with the left and right rails. That is, the horizontal elastic spring 220 may be installed in a horizontal direction of the horizontal connection frame 200 to freely move the horizontal connection frame 200 to the left and right measurement frames in the horizontal direction within a predetermined range, thereby allowing the trolley wheels, which are located at front and rear sides of the left and right measurement frames, to be respectively brought into close contact with the left and right rails even when the rails are warped.

Also, the versine trolley-type equipment 100 for inspecting track irregularity according to the embodiment of the present disclosure is provided with a function for supporting the horizontal connection frame 200, which connects the left and right measurement frames 110a and 110b, and closely respectively contacting the left horizontal measurement wheel 210a and the right horizontal measurement wheel 210b to the left and right rails using elastic forces of the horizontal measurement wheel adjustment springs 230a and 230b. That is, when the horizontal connection frame 200 is connected to the right measurement frame 110b, the horizontal measurement wheel adjustment springs 230a and 230b are installed at left and right end portions of the horizontal connection frame 200, and the left horizontal measurement wheel 210a and the right horizontal measurement wheel 210b may be respectively brought in close contact with the left and right rails using the elastic forces of the horizontal measurement wheel adjustment springs 230a and 230b.

The DAQ system 240 is installed at the horizontal connection frame 200 to acquire and display values detected from the sensors 140a, 140b, 150a, 150b, 160, 170, 180, and 190.

Also, each of FIGS. 5A to 5F illustrates a detailed structure of the connection box 200a of the horizontal connection frame 200 in the versine trolley-type equipment 100 for inspecting track irregularity according to the embodiment of the present disclosure, and particularly, FIG. 5A is a plan view illustrating the connection box 200a of the horizontal connection frame 200 as shown in FIG. 5B, FIG. 5C is a cross-sectional view in a y-z direction of the connection box 200a as shown in FIG. 5D, and FIG, 5E is a cross-sectional view in an x-z direction of the connection box 200a as shown in FIG. 5F. Referring to FIGS. 5A to 5F, when the horizontal connection frame 200 and the right measurement frame 110b are connected in the versine trolley-type equipment 100 for inspecting track irregularity according to the embodiment of the present disclosure, the connection box 200a is formed at the right side of the horizontal connection frame 200, and a horizontal elastic spring 201 and a horizontal measurement wheel adjustment spring 202 are installed inside the connection box 200a. Specifically, the horizontal elastic spring 201 is installed at left and right sides in the connection box for a buffering effect and confinement of a rotation about a Z-axis, and is brought into contact with a surface of the connection box 200a of the horizontal connection frame 200 to prevent a rotation over a predetermined degree about the Z-axis. Also, the horizontal measurement wheel adjustment spring 202 is installed at upper and lower sides in the connection box for a buffering effect and confinement of a rotation about a Y-axis, and is brought into contact with the surface of the connection box 200a of the horizontal connection frame 200 to prevent a rotation over a predetermined degree about the Y-axis.

Accordingly, the versine trolley-type equipment 100 for inspecting track irregularity according to the embodiment of the present disclosure is a versine trolley-type track irregularity inspection device for simultaneously measuring the height difference and the direction misalignment between the left and right rails, and when a traveling direction of each of the left and right measurement frames 110a and 110b, that is, a traveling direction of each of the left and right rails is defined an X-axis, a horizontal direction of each thereof is defined as a Y-axis, and a vertical direction of each thereof is defined as a Z-axis, the left measurement frame 110a may be yawed about the Z-axis with respect to the right measurement frame 110b and may be pitched about the Y-axis, and the versine trolley-type equipment 100 for inspecting track irregularity is provided with a confinement function for restricting a rotation over a predetermined magnitude about the Y-axis and the Z-axis, wherein the rotation is allowed within a predetermined angle.

The versine trolley-type equipment 100 for inspecting track irregularity according to the embodiment of the present disclosure may measure a displacement of the horizontal measurement wheel 210a for detecting a left side direction misalignment and a displacement of the horizontal measurement wheel 210b for detecting a right side direction misalignment, thereby measuring gauge irregularity.

According to the related art, the versine trolley-type track irregularity inspection device for measuring a height difference and direction misalignment of one rail should move a main measurement versine two times so as to measure a height difference and direction misalignment on each of left and right rails. However, the versine trolley-type equipment 100 for inspecting track irregularity according to the embodiment of the present disclosure can reduce a measurement time by half by simultaneously measuring a versine height difference and versine direction misalignment of the left and right rails.

Referring back to FIG. 1, in the versine trolley-type track irregularity inspection device, since one rail is provided with only a reference versine (a main measurement versine) and the other rail is provided with only a wheel for guiding a traveling of the trolley, the height difference and the direction misalignment of one rail can be measured. Therefore, to simultaneously inspect with versine on both rails, a special technical consideration is needed when the left and right measurement frames 110a and 110b are designed.

That is, in a structure in which the main measurement versine is installed in the trolley according to the related art, two wheels are brought into contact with one rail to travel thereon and a single wheel is brought into contact with the other rail to travel thereon, so that the three wheels may be brought into contact with the rails regardless of a yaw behavior and a pitch behavior in a curved section and a cant variation section. However, in the case of the versine trolley-type equipment 100 for inspecting track irregularity according to the embodiment of the present disclosure, two wheels are provided on each of the left and right sides, that is, four wheels are provided to simultaneously inspect track irregularity with versine, and thus a system capable of slightly rotating with respect to any one of the measurement frames 110a and 110b is required. If such rotation is not allowed, the wheels 120a to 120d of the trolley are not precisely brought into close contact with the left rail or the right rail such that the measurement of a height difference and direction misalignment is very difficult.

Also, when an excessive rotation is allowed about the Y-axis and the Z-axis, there is a risk of damage or the like to the versine trolley-type equipment 100 for inspecting track irregularity according to the embodiment of the present disclosure when carried and moved, and thus the versine trolley-type equipment 100 for inspecting track irregularity according to the embodiment of the present disclosure may restrict an allowed amount of rotation by contacting of the connection box.

As a result, according to the embodiment of the present disclosure, there is provided the versine trolley-type equipment for inspecting track irregularity by installing the sensors at the trolley so as to measure a height difference, direction misalignment, gauge irregularity, rail longitudinal slope, cant, and the like of the railroad rail, and which is capable of simultaneously measuring a height difference and direction misalignment of the left and right rails to reduce a measurement time by half.

According to the embodiment of the present disclosure, the left and right measurement frames horizontally freely move within a predetermined range so that the front and rear trolley wheels of the left and right measurement frames may be brought into close contact with the rails all the time even when the rails are warped, and the first and second vertical measurement wheels are respectively installed so that the first and second height difference sensors, which are displacement sensors, can detect vertical movement amounts of the first and second vertical measurement wheels to easily measure a versine height difference.

According to the embodiment of the present disclosure, the left and right measurement frames horizontally freely move within a predetermined range so that the front and rear trolley wheels of the left and right measurement frames can be brought into close contact with the rails all the time even when enlargement and narrowness of gauge between the rails and direction misalignment therebetween occur, and the horizontal measurement wheels are respectively installed so that the first and second direction misalignment sensors, which are displacement sensors, can detect horizontal movement amounts of the horizontal measurement wheels to easily measure a versine direction misalignment.

The above-described description of the present disclosure is intended only for an illustrative purpose, and it can be easily understood that other concrete forms can be devised by those skilled in the art without changing or modifying the technical spirit or essential characteristics of the present disclosure. Therefore, it should be understood that the above-described embodiments are not restrictive but illustrative in all aspects. For example, each component described as a single form may be distributed and implemented, and similarly, components described as being distributed may also be implemented in a combined form.

The scope of the present disclosure is defined by the appended claims rather than the detailed description, and all changes or modifications derived from the meaning and scope of the claims and equivalents thereto should be construed as being included within the scope of the present disclosure.

The invention claimed is:

1. A versine trolley-type equipment for inspecting track irregularity, which is capable of simultaneously measuring a height difference and direction misalignment of left and right rails, comprising:
    versine left and right measurement frames (110a and 110b) on which front and rear trolley wheels (120a to 120d) are mounted, and hung on the left and right rails to move along the left and right rails for a versine inspection;
    first and second vertical measurement wheels (130a and 130b) installed at outer side surfaces of the versine left and right measurement frames (110a and 110b) so as to be able to detect a height difference of each of the left and right rails;
    first and second height difference sensors (140a and 140b) respectively engaged with the first and second vertical measurement wheels (130a and 130b) to detect the height difference of each of the left and right rails;
    first and second direction misalignment sensors (150a and 150b) respectively installed at inner side surfaces of the versine left and right measurement frames (110a and 110b) to detect a direction misalignment of each of the left and right rails;
    horizontal measurement wheels (210a and 210b) respectively connected to the first and second direction misalignment sensors (150a and 150b) and interposed at inner lower portions between the versine left and right measurement frames (110a and 110b) so as to allow the first and second direction misalignment sensors (150a and 150b) to detect the direction misalignment; and
    a horizontal connection frame (200) interposed between the versine left and right measurement frames (110a and 110b) and configured to connect the versine left measurement frame (110a) to the right measurement frame (110b).

2. The equipment of claim 1, wherein the first and second vertical measurement wheels (130a and 130b) are respectively installed at the left and right measurement frames (110a and 110b) to vertically freely move within a predetermined range, and the first and second height difference sensors (140a and 140b), which are displacement sensors, detect vertical movement amounts of the first and second vertical measurement wheels (130a and 130b) to measure a versine height difference.

3. The equipment of claim 1, wherein the horizontal measurement wheels (210a and 210b) are respectively installed at the left and right measurement frames (110a and 110b) to horizontally freely move within a predetermined range, and the first and second direction misalignment sensors (150a and 150b), which are displacement sensors, detect horizontal movement amounts of the horizontal measurement wheels (210a and 210b) to measure a versine direction misalignment.

4. The equipment of claim 1, wherein a horizontal elastic spring (220) is installed at the horizontal connection frame (200) to allow the front and rear trolley wheels (120a to 120d), which are installed at front and rear sides of the left and right measurement frames (110a and 110b), to be respectively brought into close contact with upper surfaces of the left and right rails and side surfaces thereof, and supports the horizontal connection frame (200) connected to the left measurement frame (110a), and an elastic force is applied to the right measurement frame (110b) by the horizontal elastic spring (220) so that the front and rear trolley wheels (120a to 120d) on left and right sides are respectively brought into close contact with the left and right rails.

5. The equipment of claim 1, wherein, when the horizontal connection frame (200) is connected to the right measurement frame (110b), horizontal measurement wheel adjustment springs (230a and 230b) are installed at left and right end portions of the horizontal connection frame (200), and the left horizontal measurement wheel (210a) and the right horizontal measurement wheel (210b) are respectively brought into close contact with the left and right rails using elastic forces of the horizontal measurement wheel adjustment springs (230a and 230b).

6. The equipment of claim 1, wherein, when a traveling direction of each of the left and right rails, which is a traveling direction of each of the left and right measurement frames (110a and 110b), is defined as an X-axis, a horizontal direction of each of the left and right rails is defined as a Y-axis, and a vertical direction of each thereof is defined as a Z-axis, the left measurement frame (110a) is able to yaw about the Z-axis and to pitch about the Y-axis with respect to the right measurement frame, and the yawing and the pitching are allowed within a predetermined angle by restricting a rotation over a predetermined magnitude.

7. The equipment of claim 6, wherein a connection box (200a) is fomied at an end portion of the horizontal connection frame (200), and a horizontal elastic spring (201) and a horizontal measurement wheel adjustment spring (202) are installed inside the connection box (200a), wherein the horizontal elastic spring (201) is installed at left and right sides inside the connection box (200a) for a buffering effect and confinement of a rotation about the Z-axis and is in contact with a surface of the connection box (200a) of the horizontal connection frame (200) to prevent the rotation over a predetermined extent about the Z-axis.

8. The equipment of claim 7, wherein the horizontal measurement wheel adjustment spring (202) is installed at upper and lower sides inside the connection box for a buffering effect and confinement of a rotation about the Y-axis, and is in contact with the surface of the connection box (200a) of the horizontal connection frame (200) to prevent the rotation over a predetermined extent about the Y-axis.

9. The equipment of claim 1, further comprising:
a rail slope sensor (160) installed at the versine left measurement frame (110a) and configured to detect a rail longitudinal slope;
a taco sensor (170) installed at an outer side surface of the versine right measurement frame (110b) and configured to measure a speed of the versine trolley-type equipment (100) for inspecting track irregularity;
a gauge sensor (180) configured to detect a gauge between the left and right rails; and
a cant sensor (190) installed at an upper left portion of the horizontal connection frame (200) and configured to detect a cant amount.

10. The equipment of claim 9, further comprising a data acquisition (DAQ) system (240) installed at the horizontal connection frame (200) and configured to acquire and display values detected from the sensors (140a, 140b, 150a, 150b, 160, 170, 180, and 190).

* * * * *